Figure 1:
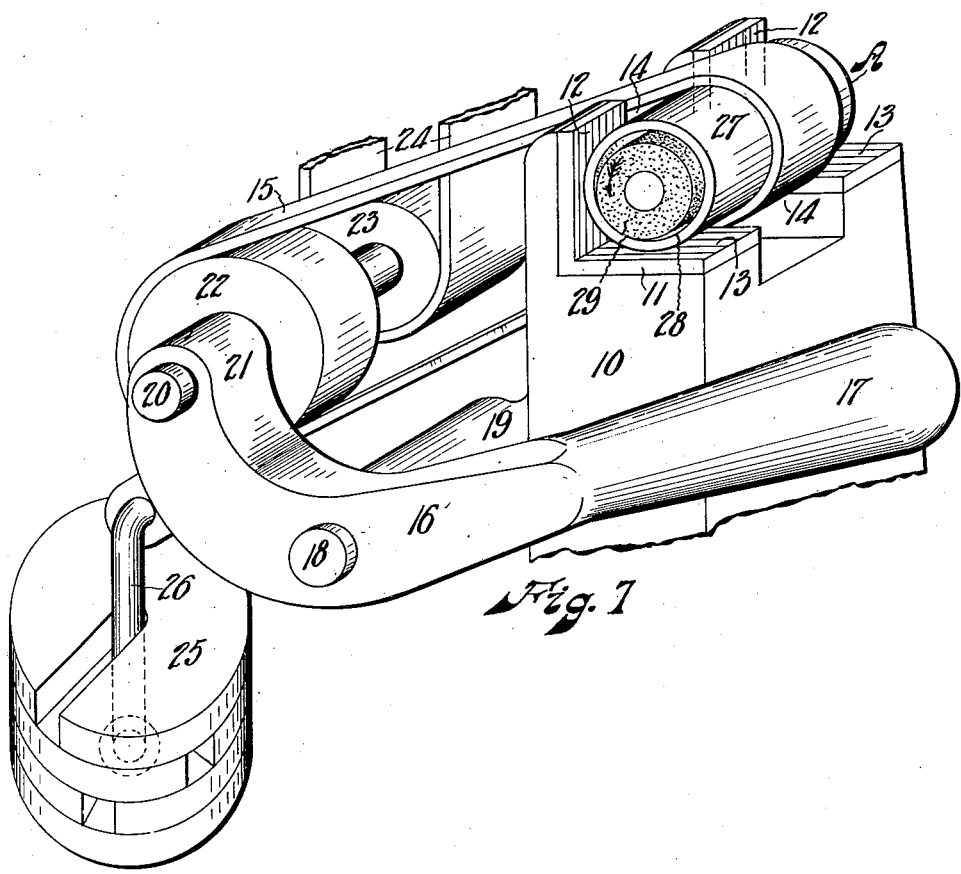

Nov. 3, 1936.　　　　O. R. BRINEY　　　2,059,723
MEANS AND METHOD FOR ROTATING AND LOCATING ARTICLES FOR MACHINING THEREOF
Filed April 13, 1927　　　2 Sheets-Sheet 1

Inventor
O. R. Briney
By C. T. Heinkel
Attorney

Nov. 3, 1936.  O. R. BRINEY  2,059,723
MEANS AND METHOD FOR ROTATING AND LOCATING ARTICLES FOR MACHINING THEREOF
Filed April 13, 1927  2 Sheets-Sheet 2

Inventor
O. R. Briney
By C. F. Heinkel
Attorney

Patented Nov. 3, 1936

2,059,723

UNITED STATES PATENT OFFICE 2,059,723

MEANS AND METHOD FOR ROTATING AND LOCATING ARTICLES FOR MACHINING THEREOF

Ottis R. Briney, Pontiac, Mich.

Application April 13, 1927, Serial No. 183,629

9 Claims. (Cl. 51—103)

My invention relates to means and methods for locating articles for purposes of machining, or finishing, or other similar or analogous purposes.

The predominating object of my invention is to provide a simple, inexpensive and efficient means and method to machine surfaces of round or tubular articles true with other surface thereof with a minimum of expense. Other objects will appear, or become apparent, or obvious, or will suggest themselves, during the description of the devices shown in the accompanying drawings, which devices were selected for the sole purpose of illustrating my invention and do not constitute a limitation of my invention and are not intended to constitute a limitation since I am well aware that my invention can be embodied in other devices.

Notation is made here that the term "machining", or the equivalent thereof, is adopted in this specification and in the appended claims to avoid the repeating of explanatory matter. This term is intended to include grinding, cutting, abrasing, extrusion, polishing, milling, or other operation, or operations, which produce a change in an article.

In machining articles it is quite essential that the various surfaces thereof are true with each other in order to permit of replacement or duplication and to facilitate the assembling of parts without the necessity of resorting to fitting or fixing or finding parts which will fit to other parts.

My invention aims to provide the necessary means and methods to produce accurate work at a minimum cost; to eliminate completely the element of human error; to avoid distortion of the articles while machining is being performed thereon; to machine one surface, or more surfaces, of an article true with other surface of the same article and also true with the natural form of the article; and to eliminate all centers, arbors, chucks, collets, steady rests, clamp means, or other similar means of the formerly known types and to replace the same with a fixed abutment against or onto which a surface of an article, or of any successive number of articles, either of the same form or size or of different forms or of different sizes, is or are held or contacted or abutted on a fixed means by resilient means which neither distort or change the natural form of the article, nor permits the article to be displaced or sprung out of its proper position during a machining operation, nor affects neither the article nor the device in any manner so that surface of the article can be machined accurately true with the contacting surface thereof without requiring any truing up or setting up of any kind either of the article or of any device or accessory associated with the machining operation.

In order to illustrate my invention for the purpose of aiding in the understanding thereof, I have embodied my invention in the devices shown in the accompanying drawings in which:—

Fig. 1 is a general perspective view of a machining device embodying the features of my invention and having a resilient belt means holding a tubular article resiliently against a fixed abutting or contacting surface of the device and a grinding wheel operating on the inner surface of the article.

Figure 2:
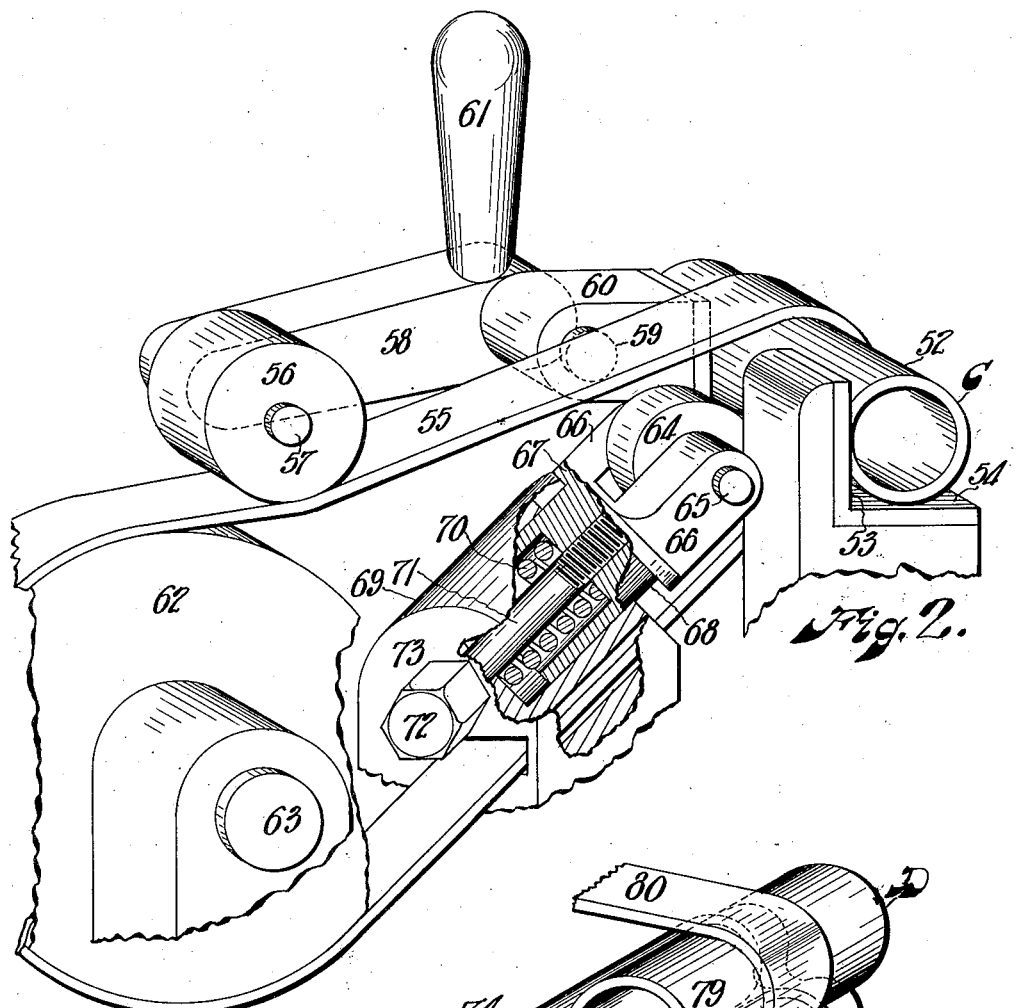

Fig. 2 is a general perspective view of a machining device embodying the features of my invention and having an adjustable belt to contact articles against fixed abutment surface and an adjustable and resiliently mounted roller to prevent excessive friction between the articles and the abutment surface; part of the structure is broken away to show the adjusting means and the spring for the roller more clearly.

Figure 3:
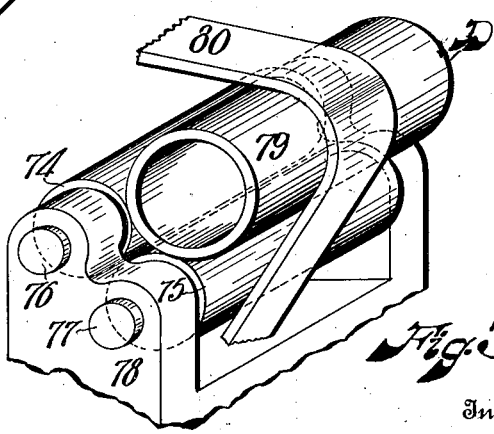

Fig. 3 is a general perspective view of a machining device embodying the features of my invention and having a pair of rollers the outer circumferential surfaces of which constitute abutment surfaces to contact articles and a belt means to rotate the articles against the abutment surfaces.

Similar reference characters refer to similar parts throughout the views which pertain to each other.

Referring now particularly to the device shown in Fig. 1 of the drawings.

The base 10 may be made of any convenient form or contour and may be fixed to or a part of a machine or may be made to fit a machine either to be bolted or otherwise secured thereon or to be movable thereon as desired or as found necessary or convenient or desirable in any particular case or in general practice.

The abutment element 11, in the present instance L shaped with the abutment or contact surfaces 12 and 13 at right angles to each other and square with the general plane of the device, are secured to the frame 10 in a fixed and immovable position and has the clearance notches 14 to clear the belt 15 in this instance. Other forms of abutment elements, such as curved contact surfaces, contact surfaces other than at right angles to each other, more or less than two contact surfaces, or other equivalent means, may be used with equally good results.

The arm 16, with the handle 17 thereon, is fulcrumed on the pin 18 which is mounted in the boss 19 extending from the base 10. The pin 20 is journaled in the boss 21 of the arm 16. The pulley 22 is secured to the pin 20 and rotates with it and the pulley 23 is secured to the pin 20 and rotates the same by means of the belt 24 driven by any suitable means not shown in the drawings.

The weights 25 are suspended on the rod 26 between the pin 18 and the inner end of the arm 16 to swivel the arm 16 on the pin 18 to create or to release tension on the belt 15 as desired to contact the surface 27 of the article A on the surfaces 12 and 13 or to release the same therefrom. The number of weights can be increased or decreased to increase or to decrease the tension of the belt 15.

The article A, in the present instance a tubular article, rests or abuts or contacts the two surfaces 12 and 13 with the outer circumferential surface 27 thereof. The belt 15 engages the surface 27 opposite the surfaces 12 and 13 and also engages the pulley 22 and is moved by means of the pulley 23 and the belt 24 thereof.

In the present instance, a machining operation is to be performed on the inner circumferential surface 28 of the article A and this operation is a grinding operation performed by means of the grinding wheel 29 in the present instance.

The operation of the device shown in Fig. 1 is as follows:—

Press the handle 17 downwardly to provide slack in the belt 15. Then lay the article A against the surfaces 12 and 13 and inside of the belt 15. Then let go of the handle whereupon the weights 25 will fulcrum the arm 16 on the pin 18 and thereby take up all of the slack in the belt 15 and contact or abut the surface 27 on the surfaces 12 and 13 with a certain amount of pressure determined by the number of weights 25 which pressure can be varied or increased or decreased as desired by the addition of more weights 25 or by removing some of the weights from the rod 26 so that any desired pressure between the surfaces 27 and 12 and 13 can be attained.

The belt 15 is flexible and will not deform the article A in any manner and holds or retains the surface 27 against the surfaces 12 and 13.

The belt 24 is now moved to rotate the pulley 22 which moves the belt 15. The movement of the belt 15 rotates the article against the surfaces 12 and 13 with the surface 27 in contact with the surfaces 12 and 13 and thereby guides the article true with the surface 27 thereof and true with the surfaces 12 and 13.

The grinding wheel 29 is now brought into contact with the inner surface 28 of the article for machining purposes and is rotated in any suitable manner to effect the grinding. The wheel 29 is moved or fed longitudinally back and forth inside of the article when the device is fixed in a certain position but may be stationary when the device is movable. The object now is to move or feed the wheel 29 and the article in relation to each other as is usual in grinding or machining operations. During this rotating and feeding, the wheel 29 is manipulated to remove as much material from the surface 28 as is desired.

It is observed that the cutting pressure of the wheel 29 is directed toward the surfaces 12 and 13 so that the action of the wheel has no effect whatever on the article in its relation to the surfaces 12 and 13 and therefore can not shift the article from its true position.

Since the article is guided by nothing more than the outer circumferential surface 27 abutting or contacting the surfaces 12 and 13 which are fixed and since the belt 15 and the action of the wheel 29 tend to retain the surface 27 against the surfaces 12 and 13 and since the wheel 29 operates at a definite distance from the surfaces 12 and 13, the inner surface 28 must be and will be machined true with the surface 27 after the machining operation is completed and the entire operation is performed without any accessories of any kind.

Any number of articles may be machined by this device and all articles so machined will be true with the guiding surface thereof.

Instead of the grinding wheel 29, a cutting tool, such as a lathe tool, can be used with the cutting edge thereof directed toward the abutment surface. The wheel 29 can also be replaced by a roller or other extrusion or burnishing tool means to smoothen surface. In fact any sort of a tool adapted for machining purposes can be used in connection with my invention.

Referring now particularly to the device shown in Fig. 2 of the drawings.

In this device, the outer circumferential surface 52 of the article C abuts or contacts the abutment surfaces 53 and 54 similar to the abutment surfaces of Fig. 1 and the article C is rotated against these surfaces by means of the belt 55. In this instance, the article is held against the abutment surfaces, or released therefrom, by tightening or slackening the belt through the roller 56 which is journaled on the shaft 57 which is mounted in the arm 58 which is mounted on the shaft 59 which is mounted in the boss 60. The handle 61 is provided to facilitate the release of the article. The weight of the roller 56 and the arm 58 may be sufficient to provide the necessary tension in the belt 55 to contact the article on the abutment surfaces with a required pressure; if that weight is not sufficient, weights as in the device shown in Fig. 1 may be applied to attain any required tension in the belt. The pulley 62, mounted on the shaft 63, moves the belt and may be rotated by any suitable means not shown.

A means to prevent excessive friction between the surfaces 52 and 53 and 54 is introduced into this device and consists of the roller 64 mounted on the shaft 65 which is mounted in the ears 66 of the adjusting member 67. The body portion 68 of the member 67 extends into the boss 69 and is slidable longitudinally therein; the inner end is hollow to house the spring 70. The screw 71 is threaded into the member 67 and extends through the hollow thereof and the head 72 thereof abuts the wall 73 in which the body of the screw 71 is journaled. The spring 70 extends between the bottom of the hollow in the member 69 and the wall 73 and tends to move the roller 64 toward the article C. The manipulation of the screw 71 adjusts the tension of the spring 70 and the contact pressure between the roller 64 and the surface 52 of the article C.

The general operation of this device is obvious in the drawings and from the descriptions of the operations given above. In this device, the surfaces 53 and 54 guide the article true with the outer circumferential surface thereof and the roller 64 contacts this same surface with just sufficient force to counteract excessive pressure of the belt 55 but with insufficient force to move the article away from the surfaces 53 and 54 when the belt is under tension.

Referring now particularly to the device shown in Fig. 3 of the drawings.

In this device, a pair of rollers 74 and 75 are used in place of the abutment elements described above. The rollers are rotatable and are mounted on the shafts 76 and 77 which are mounted in the base 78. The article D has the outer circumferential surface 79 which contacts both of the rollers and is contacted by the belt 80 which rotates the article and retains the same against the rollers.

In this device, the article is guided on the rollers and the rotation of the article against the rollers rotates the same and thereby forms an anti-friction bearing between the article and the rollers. Other operations are obvious from the drawings and the descriptions of operations given above.

In the devices shown and described and in the methods carried out by these devices, one or more abutment surfaces, positionally fixed on rotatable or on fixed or on adjustable members, contact the articles to be machined and are rotated against them and are guided by them either for aligned machining with the operating tool or for taper machining with the tool.

The articles are guided by one surface thereof so that any other surface thereof must be machined true with the guiding surface.

The guiding surfaces of the articles are rotated against abutment or guide surfaces and the pressure of the operating tool is directed toward the abutment surfaces to assist in retaining the articles against the abutment surfaces.

The rotating means for the articles are directed to retain the articles against the abutment surfaces.

The articles are confined on abutment surfaces in less than in all radial directions so that the articles can be removed from the devices without inconvenience and are held only toward the confinement thereof and leave the articles otherwise free and unaffected as to the form or to the position of each.

Although only one size of article is shown in each of the devices shown and described, it is obvious that machining operations can be performed on surfaces of variously sized articles without material change in the devices.

Although all of the articles shown and described are of true circular form cross-sectionally, it is obvious that machining operations can be performed on surfaces of articles other than truely circular in cross-section, as oval for instance, as long as the articles can be rotated against abutment surfaces. The use of the term "round" in this specification and in the appended claims is not limited to articles of truly circular cross-section.

Surfaces of articles will still be machined true with the contacting surfaces thereof even after the abutment surfaces of the devices have become worn since the contacting surfaces of the articles determines the machining of other surfaces thereof.

The machining performed on surfaces of the articles will always be true with the guiding or contacting surfaces thereof and this true machining is attained by confining the articles in less than in all radial directions and without the use or necessity of accessories which confine the articles in all radial directions or which affect the form or the position of the articles.

The illustrations shown in the drawings and the methods of machining performed thereby as described above appear to be sufficient to clearly show what my invention is. I am aware that devices other than those shown and described can carry out my invention structurally as well as methodically and that changes can be made in the structures as well as in the arrangements of elements shown and described; therefore, without limiting myself to the precise applications of my invention as shown and described nor to the precise structures and arrangements of elements as shown and described nor to the precise methods described,

I claim:—

1. A member having related abutment surfaces to be contacted by the circumferential surface of bushings at spaced points of the circumferential surface and having a clearance notch therein, transversely thereof and intermediate the ends thereof, a movable belt under tension in direct contact on the circumferential surface to effect rotation of the bushing and holding thereof to contact on the abutment surfaces for and during machining thereof, a boring tool to operate in the bore of the bushing, and means to direct the cutting pressure of said boring tool toward said abutment surfaces.

2. Related abutment surfaces adapted to be contacted by an article to locate the same for machining thereof, a belt under tension to retain and to rotate the article against said surfaces, a tool for operating on the article having the cutting pressure thereof directed toward said surfaces, and means to limit the pressure of the article against said surfaces independent of said belt.

3. Article abutment surfaces, angularly related, flat and stationary, to be contacted by an article to be machined to locate the article in a definite position for machining thereof, a belt to contact and to retain and to rotate the article against said surfaces, and a tool for boring the article having the cutting pressure thereof directed toward said surfaces.

4. A positionally fixed element having flat, stationary, angularly related abutment surfaces to be contacted by outer circumferential surface of a tubular article to locate the same in a definite position for boring thereof, a belt in direct contact on the circumferential surface of the article to rotate and to retain the same against said abutment surfaces, a boring tool for said article having the cutting pressure thereof directed toward said surfaces, and means to regulate the pressure between the article and said abutment surfaces.

5. A machining method for bushings and the like including placing each bushing sidewise against stationary abutment surfaces, successively holding and rotating each bushing against said surfaces by a flexible element, and machining inner surface of the bushing while the same is so held and rotated.

6. A machining method for bushings including placing a bushing so that the outer circumferential surface thereof contacts angularly related surfaces which are stationary relative to said circumferential surfaces when the bushing is moving, locating the bushing by rotating the same against said surfaces, machining the bore of the bushing while the same is so located and rotated, and directing the pressure of said machining toward said angularly related surfaces.

7. A machining method including rotating the outer surface of a bushing sidewise against angularly disposed, stationary bushing locating abutment surfaces while a machining operation is being performed on the bore thereof.

8. A machining means including an abutment element having angularly disposed, stationary surfaces adapted to be contacted by an article to be machined to locate the same in a definite position, a belt under tension in direct contact on the article to rotate the same and to retain the same against said surfaces, tool means operating on the article with the cutting pressure of the tool means directed toward said surfaces means to limit the pressure between the article and said surfaces, and means to release the tension of said belt to release the article for removal and insertion thereof from and into the machining means.

9. Related abutment surfaces to locate a round article in a definite position for machining thereof, a belt under tension to retain and rotate the article against said surfaces, an abutment roller contacting the article to relieve excessive friction of the article against said surfaces, and an adjusting means for said roller including an adjusting member axially movable in a body, a shaft transversely therein to carry said roller, an adjusting screw threaded into said adjusting member and having a head to abut the outer end of said body, and a spring in said adjusting member and having one end thereof in abutment thereon and the other end thereof in abutment on said body.

OTTIS R. BRINEY.